United States Patent [19]
Hwang

[11] Patent Number: 5,149,119
[45] Date of Patent: Sep. 22, 1992

[54] SHOCK-ABSORBING FOLDING BICYCLE

[76] Inventor: Tsong-Ching Hwang, No. 54-5, Sec. 1, Hsin Sheng S. Road, Taipei, Taiwan

[21] Appl. No.: 783,493

[22] Filed: Oct. 28, 1991

[51] Int. Cl.⁵ .................. B62K 17/00; B62K 15/00
[52] U.S. Cl. .................................. 280/275; 280/287
[58] Field of Search ............... 280/275, 276, 277, 283, 280/287, 639; 267/169–170, 291, 179, 71–72, 74

[56] References Cited
U.S. PATENT DOCUMENTS
2,211,164  8/1940  Rippenbein ..................... 280/287

FOREIGN PATENT DOCUMENTS
811781   4/1937  France .............................. 280/283
167880   8/1921  United Kingdom ............... 280/276

Primary Examiner—Charles A. Marmor
Assistant Examiner—Florian Zeender
Attorney, Agent, or Firm—Bacon & Thomas

[57] ABSTRACT

A folding bicycle having two handlebars which can be rotated upwards into a horizontal position for steering control or downwards into a collapsed position to reduce space occupation, a toggle joint fastened in a top tube for permitting the top tube to be folded up, and a shock-absorbing device fastened in a down tube for absorbing shock-waves and permitting the down tube to be folded up into a collapsed position.

5 Claims, 10 Drawing Sheets

SHOCK-ABSORBING FOLDING BICYCLE

BACKGROUND OF THE INVENTION

The present invention relates to bicycles and relates more particularly to a folding bicycle with shock-absorbing means.

Conventionally, the frame of a bicycle is of a fixed structure which occupies much space for storage. If one is living in an apartment, it is very difficult or inconvenient to store a bicycle in one's room at a higher floor. Storing a bicycle in the passage way or fire-escape in a building or apartment may obstruct others from passing therethrough. Further, the rigid structure of a bicycle frame may cause a bicycle rider to feel uncomfortable while running over an uneven ground area.

SUMMARY OF THE INVENTION

The present invention has been accomplished to eliminate the aforesaid problems. It is therefore an object of the present invention to provide a folding bicycle which has shock-absorbing means fastened in the frame thereof to eliminate shock waves so that one does not feel uncomfortable while riding a bicycle over an uneven ground area. It is another object of the present invention to provide a folding bicycle in which the handlebars and the frame are foldable for convenient storage with less space occupation. It is still another object of the present invention to provide a folding bicycle which can be detachably attached with shock-absorbing means according to one's desire. It is still another object of the present invention to provide a folding bicycle which has an innovative structure and is easy to manufacture. It is still another object of the present invention to provide a folding bicycle in which the structure is applicable to any of a variety of existing bicycles. It is yet a further object of the present invention to provide a folding bicycle which can be conveniently folded up for carrying in the trunk of an automobile.

According to the present invention, there is provided a folding bicycle which comprises two foldable handlebars which can be rotated upwards into a horizontal position for steering control or downwards into a collapsed position to reduce space occupation, a toggle joint fastened in the top tube thereof permits the top tube to be folded up, and a shock-absorbing device fastened in the down tube thereof for absorbing shock-waves and permitting the down tube to be folded up into a collapsed position.

BRIEF DESCRIPTION OF THE DRAWINGS

FIG. 2-1 is a partly perspective view of the handlebars in an enlarged scale;

DETAILED DESCRIPTION OF THE PREFERRED EMBODIMENT

Figure 1:
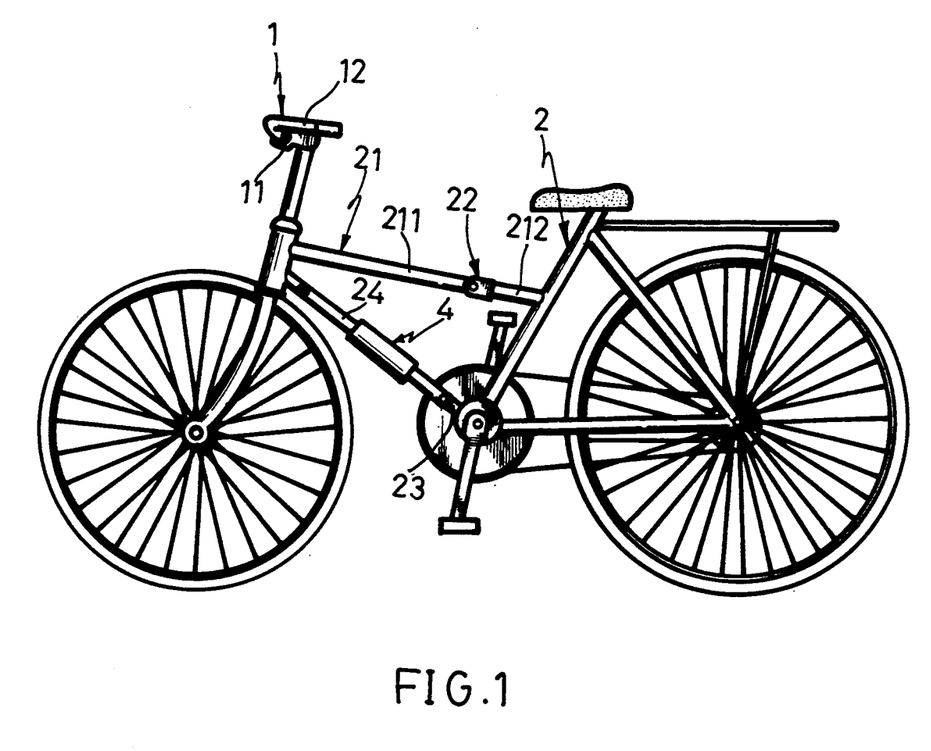
FIG. 1 illustrates a folding bicycle embodying the present invention.
Figure 2:
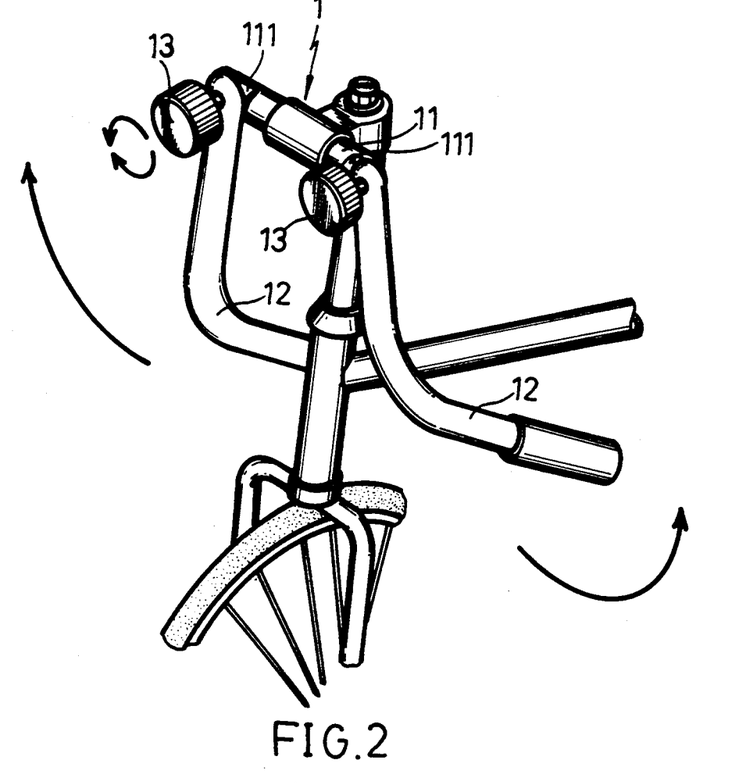
FIG. 2 illustrates the folding direction of the handlebars.
Figure 21:
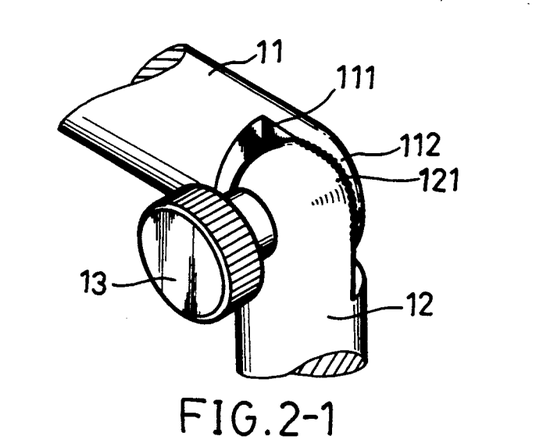

Referring to FIGS. 1, 2 and 2-1, the head tube assembly 1 comprises a transverse rod 11 having two handlebars 12 secured thereto at two opposite ends by two screws 13. The transverse rod 11 has two ratchets 112 made on the two recesses 111 at the two opposite ends thereof. The handlebars 12 each has a ratchet 121 at one end engaged with the ratchet 112 on the recess 111 at either end of the transverse rod 11 and secured in position by either screw 13. By means of controlling the screws 13, the handlebars 12 can be relatively extended outwardly to a horizontal position or rotated downwardly and inwardly to reduce space occupation.

Figure 3:
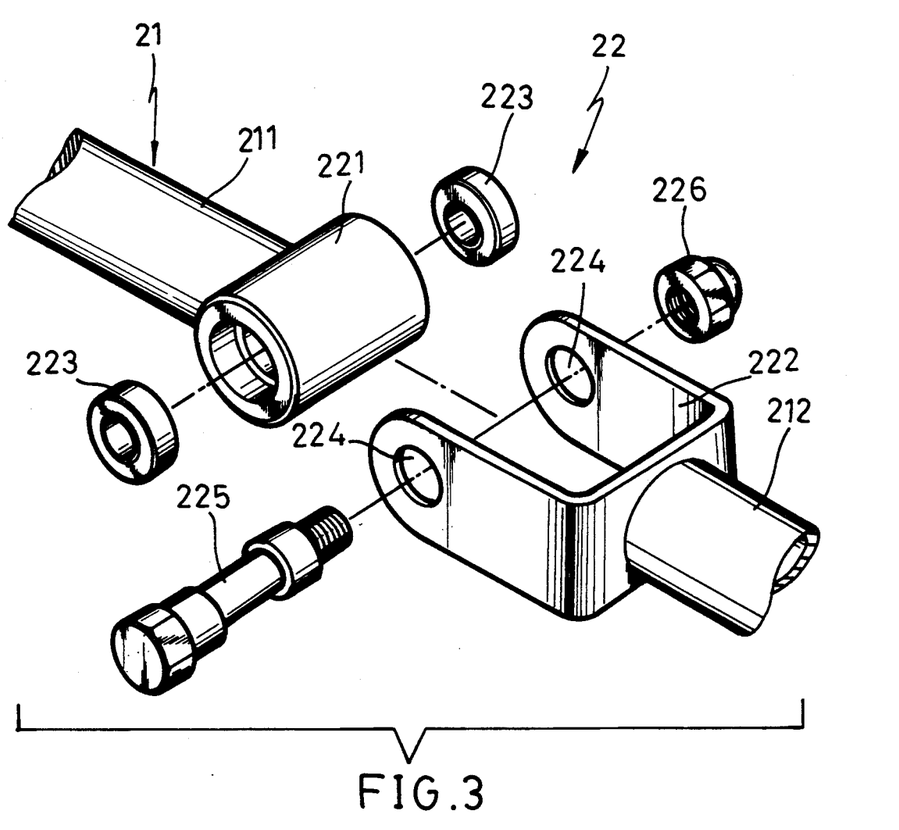
FIG. 3 is an exploded perspective view of the toggle joint.

Referring to FIG. 3 and seeing FIG. 1 again, the top tube 21 is obliquely connected between the seat tube 2 and the head tube assembly 1 at the top is comprised of a front tube 211 and a rear tube 212 connected by a toggle joint 22. The toggle joint 22 comprises a stub tube 221 transversely fastened in the front tube 211 at one end, which stub tube 221 has two bearings 223 fastened therein at two opposite ends, an U-shaped frame 222 fastened to the rear tube 212 at one end adjacent to the front tube 211 for connection, which U-shaped frame 222 has two pivot holes 224 at two opposite ends respectively secured to the two bearings 223 by a lock bolt 225 and a lock nut 226. By means of the arrangement of the toggle joint 22, the front and rear tubes 211, 212 are movably connected together.

Figure 4:
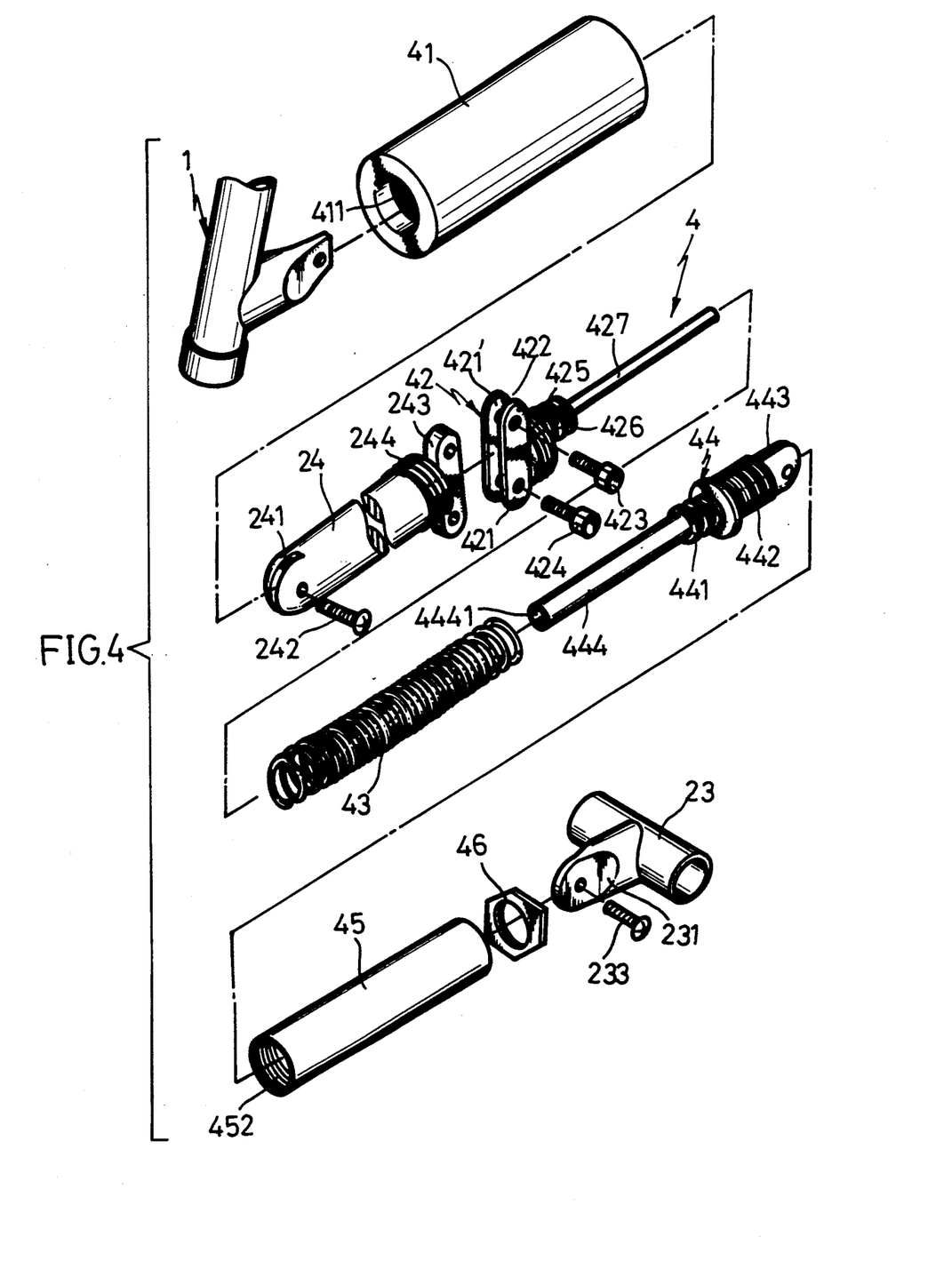
FIG. 4 is an exploded perspective view of the shock-absorbing device.
Figure 5:
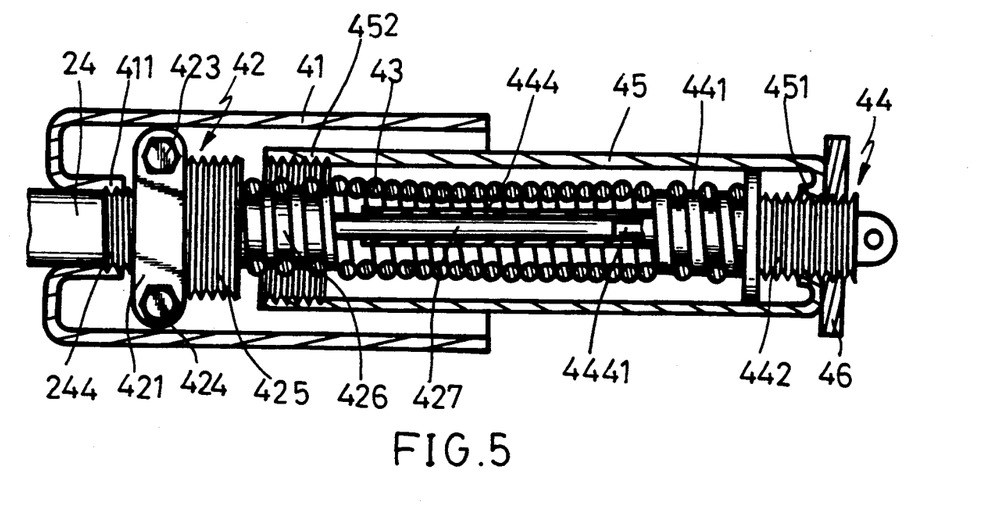
FIG. 5 is a sectional view of the shock-absorbing device taken in longitudinal direction showing the tension spring connected between the front and rear connectors to absorb and eliminate shock waves.

Referring to FIGS. 4 and 5 and FIG. 1 again, the down tube 24 which is connected between the head tube assembly 1 and the bottom bracket 23 at the bottom of the seat tube 2 is attached with a shock-absorbing device 4. The down tube 24 has a forked portion 241 at one end pivotably secured to the head tube assembly 1 by a screw 242 and an outer thread 244 and a joint 243 at an opposite end. There is provided a protective sleeve 41 having an inner thread 411 on the inner wall surface thereof which is screwed up with the outer thread 244 on the down tube 24 for protecting the shock-absorbing device 4. The shock-absorbing device 4 comprises a front connector 42, a tension spring 43, a rear connector 44, a connecting sleeve 45 and an adjusting nut 46. The front connector 42 comprises a joint holder 422 at one end which is comprised of two symmetrical connecting plates 421, 421' for holding the joint 243 by screws 423, 424, an outer thread portion 425 adjacent to the joint holder 422, a worm 426 adjacent to the outer thread portion 425, and an elongated rod 427 extending from the worm 426 at one end. The rear connector 44 comprises an elongated sleeve 444 having a bore 4441 for inserting the elongated rod 427 of the front connector 42, a worm 441 on the elongated sleeve 444 at one end, an outer thread portion 442 adjacent to the worm 441, and a forked connecting end 443 adjacent to the outer thread portion 442 opposite to the worm 441 for connecting to a connecting lug 231 on the bottom bracket 23 by a screw 233. The tension spring 43 has one end fastened in the worm 426 on the front connector 42 and an opposite end fastened in the worm 441 on the rear connector 44. The connecting sleeve 45 has two inner threads 451, 452 at two opposite ends respectively screwed up with the outer thread portions 425, 442 of the front and rear connectors 42, 44 to hold the tension spring 43 therein and to connect the front and rear connectors 42, 44 together. The adjusting nut 46 is mounted on the outer thread portion 442 on the rear connector 44 for controlling the position of the connecting sleeve 45 on the front and rear connectors 42, 44.

Figure 6:
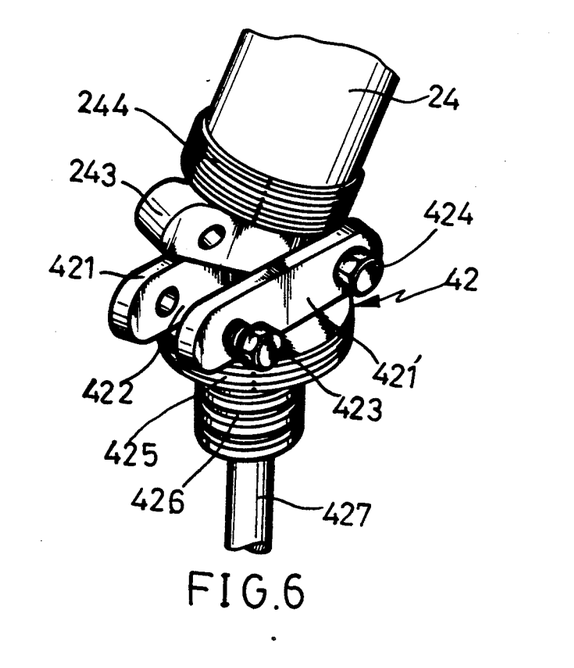
FIG. 6 illustrates the down tube folded up relative to the front connector.
Figures 7, 8:
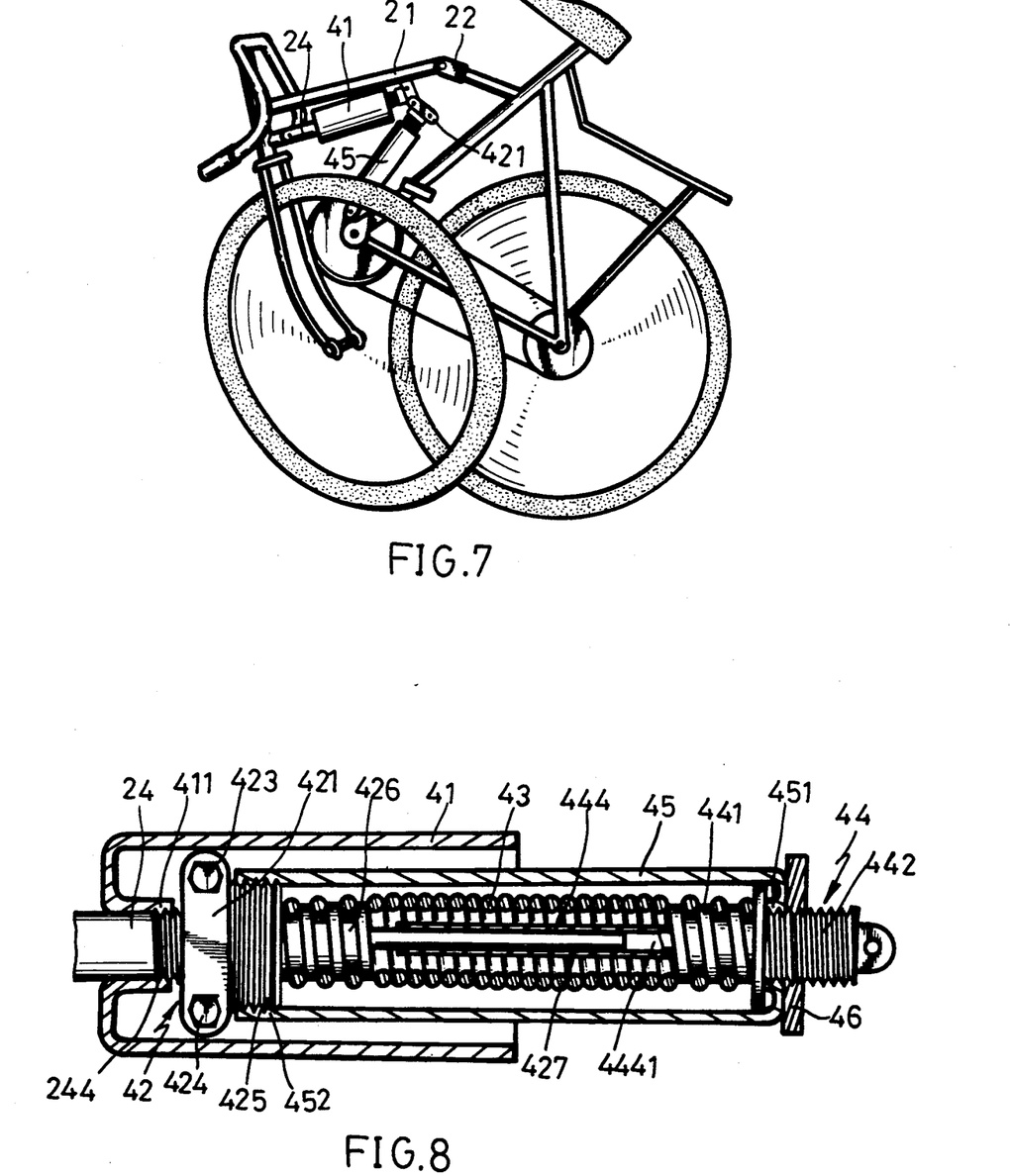
FIG. 7 illustrates the folding bicycle folded up into a collapsed structure.
FIG. 8 is another sectional view of the shock-absorbing device taken in longitudinal section showing the front and rear connectors connected by the connecting sleeve, and therefore, the tension spring does no work.

Referring to FIGS. 6 and 7, because the joint 243 on the down tube 24 is connected to the joint holder 422 by screws 423, 424, the down tube 24 and the front connector 42 can be folded up by releasing the joint 243 from the screw 423.

Referring to FIG. 8 and FIG. 5 again, the connecting sleeve 45 may be released from the outer thread portion 425 on the front connector 42 permitting the front and rear connectors 42, 44 to be connected together by the tension spring 43 so that any shock waves can be absorbed or eliminated by the tension spring 43. Once the inner threads 451, 452 of the connecting sleeve 45 are respectively screwed up with the outer thread portions 425, 442, the front and rear connectors 42, 44 become connected by the connecting sleeve 45, i.e. the tension spring 43 does no work.

Figure 9:
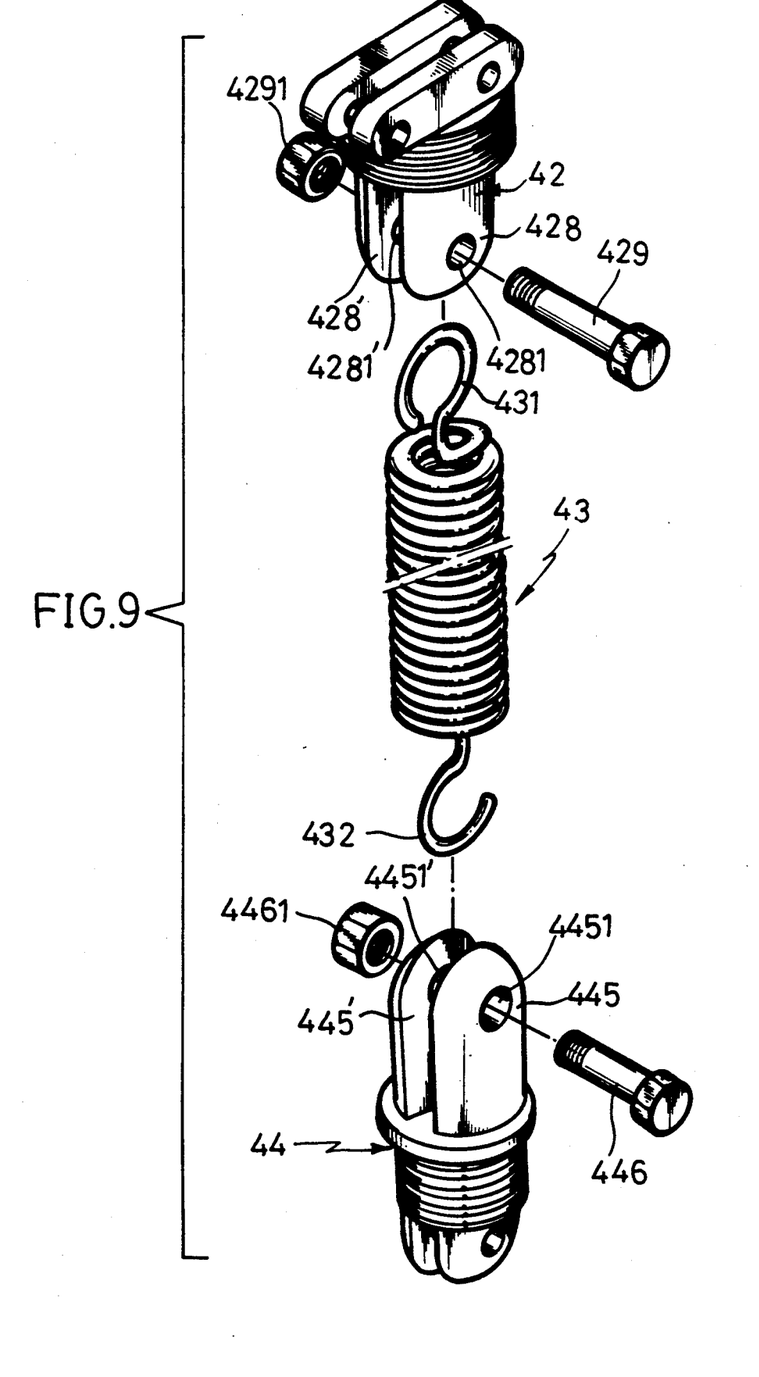
FIG. 9 illustrates an alternate form of the shock-absorbing device.

Referring to FIG. 9, therein illustrated is an alternate form of the shock-absorbing device 4. In this alternate form, the front and rear connectors 42, 44 each has two symmetrical lugs 428, 428'; or 445, 445' with holes 4281, 4281'; or 4451, 4451' respectively made thereon for fastening the two opposite hooked ends 431, 432 of the tension spring 43 by bolt 429 or 446 and nut 4291 or 4461.

Figure 10:
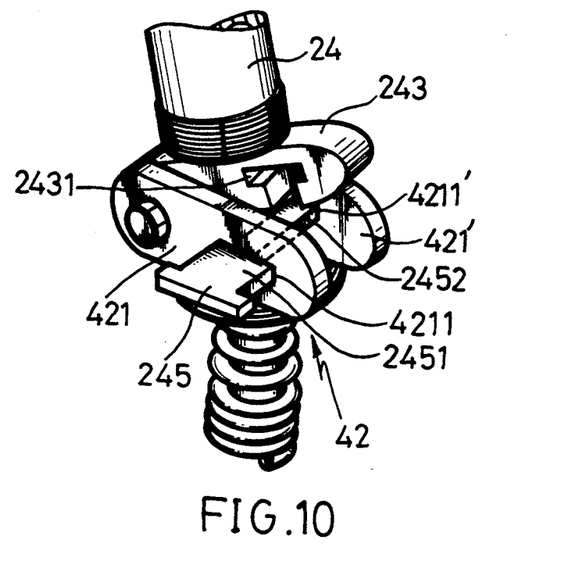
FIG. 10 illustrates an alternate form of the folding connecting structure between the down tube and the front connector.
Figure 11:
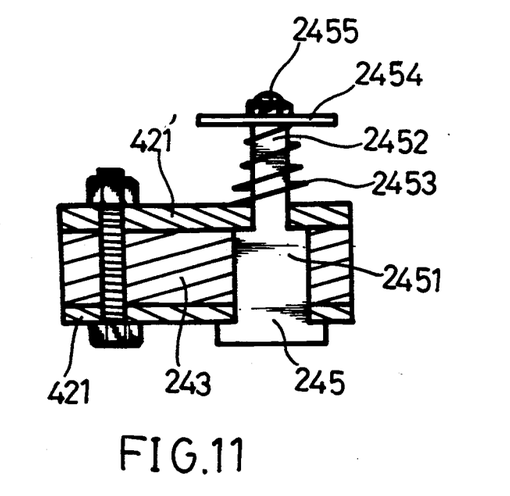
FIG. 11 is a sectional view taken on FIG. 10.

Referring to FIGS. 10 and 11, the connection between the down tube 24 and the front connector 42 may be modified. As illustrated, the joint 243 on the down tube 24 has a stepped slot 2431. The connecting plates 421, 421' of the front connector 42 each has a hole 4211 or 4211' thereon, wherein the hole 4211 on the left-sided connecting plate 421 is larger than the hole 4211' on the right-sided connecting plate 421'. There is a control pin 245 inserted through the hole 4211 on the left-sided connecting plate 421 into the hole 4211' on the right-sided connecting plate 421'. The control pin 245 has an elongated rod 2452 extending from a shoulder 2451. When the control pin 245 is inserted through the two connecting plates 421, 421', the shoulder 2451 is engaged into the stepped slot 2431 to secure the front connector 42 to the bottom tube 24 and, the elongated rod 2452 is projecting out of the right-sided connecting plate 421' and attached with a spring 2453, a washer 2454 and a lock nut 2455 in proper order. Moving the elongated rod 2452 backwards causes the stepped slot 2431 to disengage from the control pin 245, and therefore, the down tube 24 can be folded up relative to the front connector 42.

Figure 12:
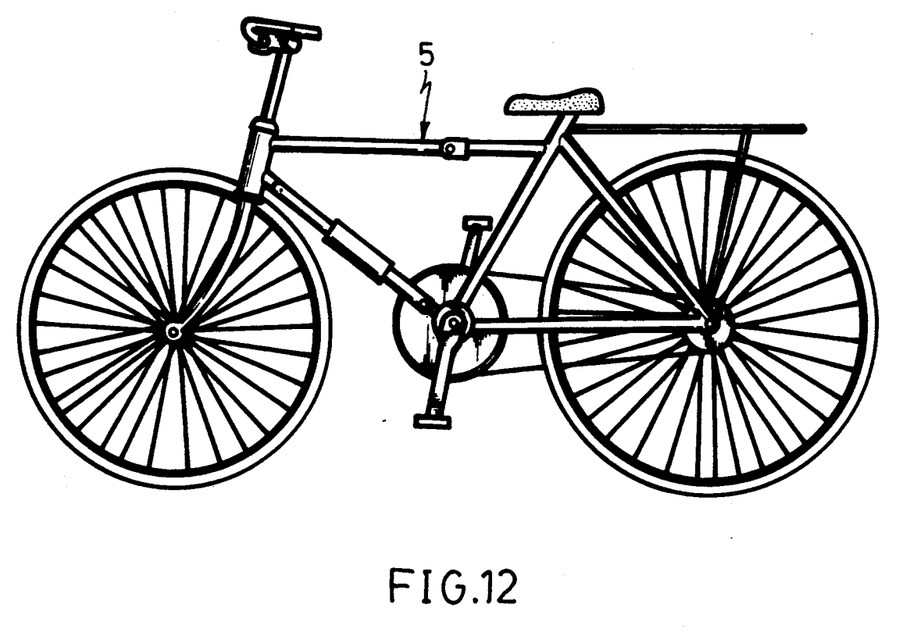
FIG. 12 illustrates an alternate form of the folding bicycle as constructed according to the present invention, in which the top tube is connected between the head tube assembly and the seat tube in a horizontal direction.

Referring to FIG. 12, there is illustrated an alternate form of the top tube. In this embodiment, the top tube 5 (the structure of which is the same as the top tube 21 in FIG. 1) is connected between the seat tube and the head tube assembly at the top in a horizontal direction.

Figure 13:
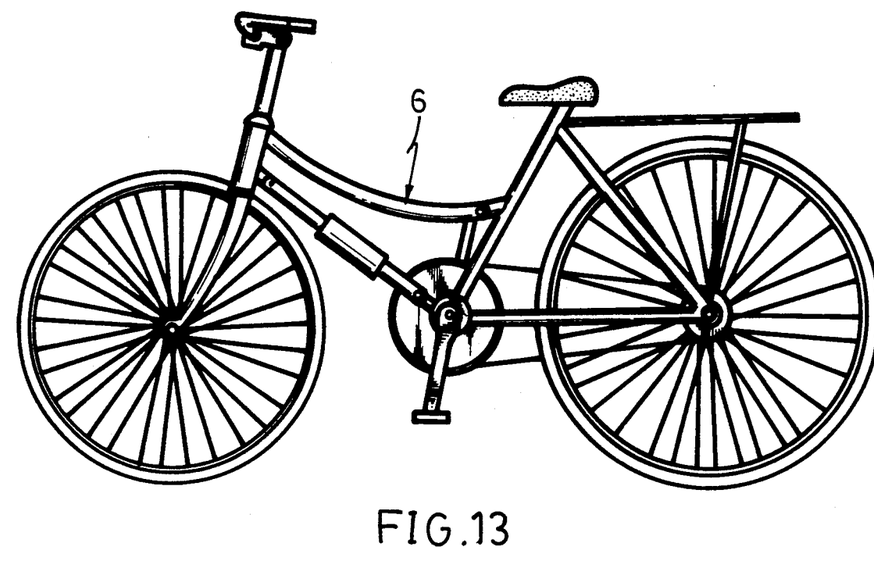
FIG. 13 illustrates another alternate form of folding bicycle as constructed according to the present invention, in which the top tube is made into a double-tube frame.
Figure 14:
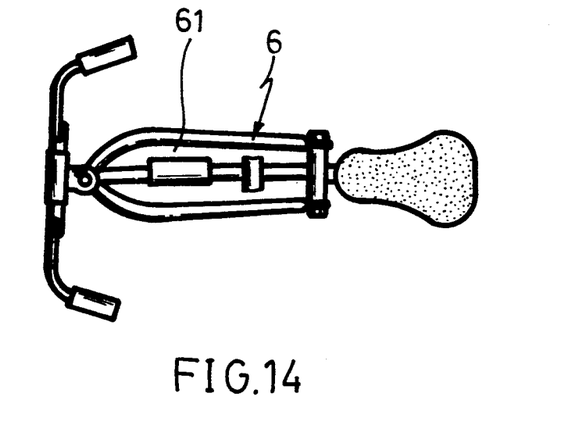
FIG. 14 is a top view of FIG. 13 showing the two tubes of the double-tube frame curved outwards with a space defined therebetween.

Referring to FIGS. 13 and 14, for a lady's bicycle having a double-tube frame 6, the two tubes of the double-tube frame 6 are curved outwardly with a space 61 defined therebetween so that the double-tube frame 6 will not hinder the folding operation of the bicycle frame.

What is claimed is:

1. A folding bicycle comprising:
  a) a head tube assembly for steering control, the head tube assembly including a transverse rod having a pair of recesses at two opposite ends thereof, a pair of ratchets disposed in the pair of recesses, a pair of handle bars secured to the transverse rod, each handle bar having a ratchet at one end thereof engaged with a corresponding ratchet in a recess and secured in position by a screw;
  b) a top tube, a seat tube, the top tube being connected between the head tube assembly and the seat tube, the top tube including a front tube and a rear tube, a toggle joint connecting the front and rear tubes, the toggle joint including a stub tube transversely fastened on the front tube at one end thereof, the stub tube including two bearings fastened therein at two opposite ends thereof, a U-shaped frame fastened on the rear tube at one end thereof, the U-shaped frame including two pivot holes at two opposite ends, and a bolt and a lock nut securing the U-shaped frame to the two bearings;
  c) a down tube, a shock-absorbing device secured in the down tube, a protective sleeve enclosing the shock-absorbing device, a bottom bracket at a bottom end of the seat tube, the down tube being connected between the head tube assembly and the bottom bracket, the down tube including a forked portion at one end pivotally secured to the head tube assembly by a screw, an outer threaded portion and a joint at an opposite end;
  d) the shock-absorbing device including a front connector, a tension spring, a rear connector, a connecting sleeve and an adjusting nut;
  e) the front connector including a joint holder at one end, the joint holder being comprised of two symmetrical connecting plates for holding the joint on the down tube, means for securing the joint holder to the joint, an outer threaded portion, a worm, and an elongate rod;
  f) the rear connector including an elongate sleeve, the elongate rod being disposable within the elongate sleeve, a worm, an outer threaded portion and a forked connecting end connected to the bottom bracket by a screw;
  g) the tension spring having one end secured to the worm on the front connector and an opposite end secured to the worm on the rear connector;

h) the connecting sleeve including two internally threaded opposite ends releasably and threadedly engaged with the outer threaded portions of the front and rear connectors to enclose the tension spring therein;

i) the adjusting nut being mounted on the outer threaded portion of the rear connector for controlling the position of the connecting sleeve on the front and rear connectors; and j) wherein the handle bars may be rotated upwardly and secured in a horizontal position for steering control or rotated downwardly into a collapsed position to reduce space occupation, the connecting sleeve may have one end released from the outer threaded portion of the front connector to permit the front and rear connectors to be connected by the tension spring for absorbing shock, the toggle joint for permitting the top tube to be folded up into a collapsed position, and the connection of the joint on the down tube and the joint holder on the front connector permits the down tube to be folded up into a collapsed position.

2. The folding bicycle of claim 1 wherein when the two internal threads of the connecting sleeve are threadedly engaged onto the outer threaded portions of the front and rear connectors, the front and rear tubes are connected together by the connecting sleeve so as to eliminate the tension spring from doing work.

3. The folding bicycle of claim 1 wherein the means for securing the joint holder to the joint includes:

a) a control pin;

b) the joint on the down tube being provided with a stepped slot for connecting the joint holder by the control pin;

c) the two connecting plates of the joint holder each having a hole formed therein for receiving the control pin, with the holes being of different sizes;

d) the control pin including a shoulder, an elongate rod extending from the shoulder, the shoulder being disposable between the two connecting plates and engageable within the stepped slot for firmly securing the joint to the joint holder; and e) the elongate rod being insertable through the joint holder and secured therein by a spring, a washer and a lock nut to permit movement of the elongate rod for disengaging the control pin from the stepped slot and permitting the bottom tube to be folded up into a collapsed position.

4. The folding bicycle of claim 1 wherein the means for securing the joint holder to the joint includes a plurality of screws.

5. A folding bicycle comprising:

a) a head tube assembly for steering control, the head tube assembly including a transverse rod having a pair of recesses at two opposite ends thereof, a pair of ratches disposed in the pair of recesses, a pair of handle bars secured to the transverse rod, each handle bar having a ratchet at one end thereof engaged with a corresponding ratchet in a recess and secured in position by a screw;

b) a top tube, a seat tube, the top tube being connected between the head tube assembly and the seat tube, the top tube including a front tube and a rear tube, a toggle joint connecting the front and rear tubes, the toggle joint including a stub tube transversely fastened on the front tube at one end therof, the stub tube including two bearings fastened therein at two opposite ends thereof, a U-shaped frame fastened on the rear tube at one end thereof, the U-shaped frame including two pivot holes at two opposite ends, and a bolt and a lock nut securing the U-shaped frame to the two bearings;

c) a down tube, a shock-absorbing device secured in the down tube, a protective sleeve enclosing the shock-absorbing device, a bottom bracket at a bottom end of the seat tube, the down tube being connected between the head tube assembly and the bottom bracket, the down tube including a forked portion at one end pivotally secured to the head tube assembly by a screw, an outer threaded portion and a joint at an opposite end;

d) the shock-absorbing device including a front connector, a tension spring, a rear connector, a connecting sleeve and an adjusting nut;

e) the front connector including a joint holder comprised of two symmetrical connecting plates for securing the joint holder to the joint, an outer threaded portion and a pair of symmetrical lugs;

f) the rear connector including an outer threaded portion, a forked connecting end connected to the bottom bracket by a screw, and a pair of symmetrical lugs;

g) the tension spring including two ends, one end being secured to the pair of symmetrical lugs of the front connector and the other end being secured to the pair of symmetrical lugs of the rear connector;

h) the connecting sleeve including two internally threaded opposite ends releasably and threadedly engaged with the outer threaded portions of the front and rear connectors to enclose the tension spring therein;

i) the adjusting nut being mounted on the outer threaded portion of the rear connector for controlling the position of the connecting sleeve on the front and rear connectors; and j) wherein the handle bars may be rotated upwardly and secured in a horizontal position for steering control or rotated downwardly into a collapsed position to reduce space occupation, the connecting sleeve may have one end released from the outer threaded portion of the front connector to permit the front and rear connectors to be connected by the tension spring for absorbing shock, the toggle joint for permitting the top tube to be folded up into a collapsed position, and the connection of the joint on the down tube and the joint holder on the front connector permits the down tube to be folded up into a collapsed position.

* * * * *